Oct. 23, 1962 J. E. PIERCE ETAL 3,059,277
EXTRUSION DIE
Filed Sept. 30, 1960

INVENTORS.
James E. Pierce
Gordon C. Reish
BY Earl D. Ayers
AGENT pt Office 3,059,277
Patented Oct. 23, 1962

3,059,277
EXTRUSION DIE
James E. Pierce and Gordon C. Reish, Midland, Mich., assignors to The Dow Chemical Company, Midland, Mich., a corporation of Delaware
Filed Sept. 30, 1960, Ser. No. 59,749
3 Claims. (Cl. 18—14)

This invention relates to extrusion dies and particularly to rotary dies in which coolant is introduced axially through the inner part of the die body.

In film extrusion processes slight variations in circumferential resin flow through a die are amplified when successive layers of the extruded film are wound on a mill roll. The result of such variations in circumferential resin flow through the extrusion die are mill rolls having ridges, wrinkles, hard and soft areas, or telescoped rolls. Adjustment and controlled heating of the die are normally used to provide correction in the flow of material through the die.

It should be emphasized, however, that the above mentioned variations in film thickness are slight and are not objectionable for most end uses of the film.

Randomization of gauge thickness of the extruded film across the mill roll during wind up prevents the thicker sections of the sheet from accumulating in one spot and a mill roll of generally constant diameter results. Such randomization is achieved either by rotating the entire windup assembly or by rotating the die.

Accordingly, a principal object of this invention is to provide an improved rotating die.

Another object of this invention is to provide an improved means of uniformly distributing plastic to a rotating extrusion die.

A further object of this invention is to provide an improved rotating die assembly which is easily cleaned or rotated.

In accordance with this invention there is provided an improved rotating die assembly having axially extending means for introducing to and withdrawing air from the forward or output end of the die and means including a circumferentially extending resin flow channel, and rotating feed port and resin distributing sleeve and bearing for feeding resin through the rotating side wall of the die.

Figure 1:
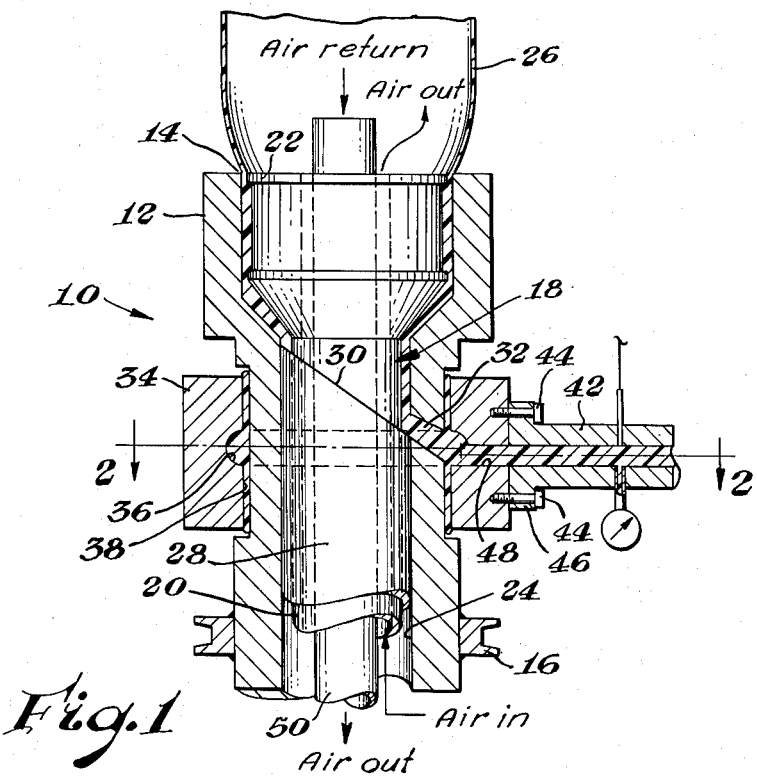
Figure 2:
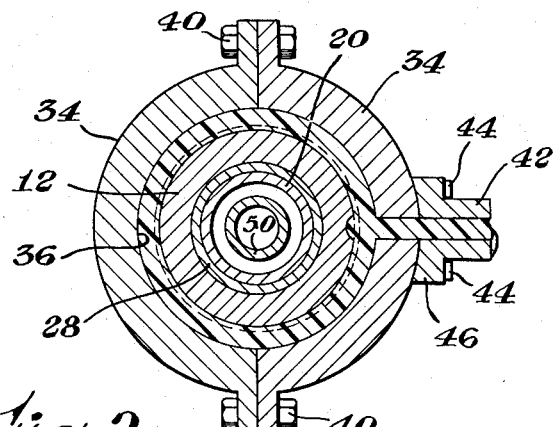

The invention, as well as additional objects and advantages thereof, will best be understood when the following detailed description is read in connection with the accompanying drawings, in which:

FIG. 1 is a side elevational view, in simplified form, of a die made in accordance with this invention, and FIG. 2 is a sectional view taken along the lines 2—2 of FIG. 1.

Referring to the drawings, there is shown a rotating die assembly, indicated generally by the numeral 10, comprising a metal die body 12 having a die face 14 at its output end and means, such as a sheave 16, coupled intermediate the ends of the body 14 for rotating the die assembly 10. A metal mandrel, indicated generally by the numeral 18, having an elongated hollow cylindrical body 20 and an outwardly flared end 22 is disposed adjacent to the die face 14 which, with the face 14, defines the wall thickness of the extruded tube or bubble 26 issuing from the die.

The body 20 of the mandrel 18 is of smaller diameter than the inner axial bore 24 of the die body. Resin distribution means, 28, an elongated metal tube or sleeve having a circular transverse cross sectional configuration, fits closely between the wall of the axial bore 24 and the outer surface of the body 20 of the mandrel 18. The resin distribution sleeve 28 has a truncated end 30 (formed as by the intersection of a plane surface cutting across the sleeve at an acute angle with respect to the longitudinal axis of the sleeve) which extends from near the outwardly flared part of the mandrel 20 to a feed port 32 which extends through the die body 12 a substantial distance below the die face 14.

A stationary bearing 34, usually made of bronze in two sections, is clamped around the die body 12 intermediate its ends and having a circumferential resin channel 36 on its inner surface 38. The sections of the bearing 34 are held together in close fitting sliding relationship with respect to the die body 12 by means of bolts 40. A resin feed line 42 is coupled to the bearing 34 by means of bolts 44 extending through the flange 46 and engaging the body of the bearing. A bore 48 in the bearing 34 extends from the resin channel 36 to the feed line 42.

An axially extending hollow tube 50 is disposed within and extending from the output or die face end of the mandrel 20. The tube 50 has an outer diameter which is smaller than the inner diameter of the mandrel 20. The annular space between the inner wall of the mandrel and the outer wall of the tube 50 constitutes an air inlet passageway and the tube interior constitutes an air outlet passageway.

In operation the die is rotated by means of the drive sheave 16 at a rate of approximately ¼ revolution per minute. Any variation in wall thickness of the extruder are therefore distributed along the width of the mill roll as the subsequently expanded bubble is slit and coiled in roll form.

Resin feed material, polyethylene, for example, is pumped from the extruder (not shown) through the feed line 42 and into the circumferential resin channel 36 in the bearing 34. As the die rotates, the feed port 32 and truncated end 30 of the resin distribution sleeve 28 move around the channel 36 and allow feed material from successive parts of the channel 36 to enter the space between the mandrel 18 and the inner wall of the die body 12 and then be extruded through the die to form the bubble 26 as the extruded tube is passed through pinch rolls (not shown) and air is injected into the now closed ended tube to expand it.

The bearing 34 acts as a self-lubricating bearing because the clearance between it and the outer mating wall of the die body is such that a small amount of the resin feed exudes through this space. The result is that the feed material is not contaminated by other materials or by degrading due to it being caught in a dead space in the bearing.

As the die rotates, feed material from all around the circumferential resin channel is forced through the die, the truncated distribution sleeve helping to equalize the flow rate of feed material around the die circumference.

Thus, in the die of this invention, means are provided to axially introduce and remove air from the extruded bubble and to introduce feed resin from the side through a self-cleaning and lubricating bearing assembly to provide a truncated distribution sleeve which causes the plastic to be discharged out of the die orifice at a more or less constant rate throughout its circumference.

While the invention has been described in connection with a die of simplified construction, it is believed that those who are skilled in the art of die design and construction will be able to adapt it to many die assemblies without departing from the scope of the invention.

What is claimed is:

1. A rotating die assembly comprising a die body having a die lip at one end and drive means for rotating said die body, said drive means being spaced from said die tip and coupled to said die body, a hollow mandrel, said mandrel being disposed within said die body in axial alignment therewith, said mandrel having a tubular part, resin distribution means, said resin distribution means including a sleeve having a truncated end section, said sleeve being disposed over the tubular part of the mandrel in close fitting relationship therewith and with said die body, the truncated end of the sleeve facing the die lip end of the assembly, a feed port, said feed port extending through the wall of said die body in alignment with the part of the truncated end of the sleeve which is most remote from the die lip, a bearing assembly, said bearing assembly having an inner wall surface which is adapted to mate with an outer wall surface of said die body through which said feed port extends, the inner diameter of said bearing being closely spaced from said mating outer wall surface of said die body, the inner surface of said bearing having a circumferentially extending flow channel which is perpendicularly disposed with respect to the longitudinal axis of the die body and in alignment with the feed port, and means for introducing feed material to said circumferentially extending flow channel.

2. A die assembly in accordance with claim 1, wherein said spacing between the mating wall surface and the inner surface of the bearing constitutes a controlled leakage lubrication path for said bearing.

3. A die assembly in accordance with claim 1, wherein said die assembly bearing is adapted to be coupled to an extruder.

References Cited in the file of this patent

UNITED STATES PATENTS

| | | |
|---|---|---|
| 2,697,852 | Bailey | Dec. 28, 1954 |
| 2,803,042 | Karl-Gustav Lundh | Aug. 20, 1957 |
| 2,937,402 | Pierce | May 24, 1960 |
| 2,957,201 | Fields | Oct. 25, 1960 |